United States Patent
Erlichman

[15] 3,668,991
[45] June 13, 1972

[54] FOLDING CAMERA

[72] Inventor: Irving Erlichman, Wayland, Mass.
[73] Assignee: Polaroid Corporation, Cambridge, Mass.
[22] Filed: June 13, 1969
[21] Appl. No.: 832,945

[52] U.S. Cl. ..............................................................95/39
[51] Int. Cl. ......................................................G03b 17/04
[58] Field of Search ...............................................95/39, 40

[56] References Cited

UNITED STATES PATENTS

| | | | |
|---|---|---|---|
| 176,464 | 4/1876 | Fellows | 95/39 X |
| 1,851,095 | 3/1932 | Gosselin | 95/40 |

*Primary Examiner*—John M. Horan
*Attorney*—Brown and Milkulka and Robert E. Corb

[57] ABSTRACT

A compact folding camera of the self-developing type comprising a housing including two sections coupled by a bellows and movable relative to one another between folded and extended positions. One section includes means for locating a photosensitive element in position for exposure and means for processing the exposed element. The second section includes an objective lens and a mirror for reflecting light from the lens to the photosensitive element. The mirror is movable to permit viewing through the lens. The second section comprises two relatively movable portions, one including the lens, a shutter, components of a viewing and/or ranging system, and a motor for driving the shutter and the processing means, the mirror being included in the other portion and the bellows being attached thereto. The two portions are adapted to couple with one another in the extended position and be separated for more compactness in the folded position, while the mirror functions to prevent admission of light into the camera when the two portions are separated.

31 Claims, 9 Drawing Figures

INVENTOR.
IRVING ERLICHMAN
BY Brown and Mikulka
and
Robert E. Corb
ATTORNEYS ns 3,668,991

FOLDING CAMERA

The present invention is concerned with a self-developing camera of the type adapted for use with an integral film unit including photosensitive and image-receiving elements arranged in face-to-face relation and a container of processing liquid adapted to be distributed within the film unit between the elements, following exposure of the photosensitive element to light transmitted through the image-receiving element, to produce a visible, positive, transfer image. Film units of this type are disclosed, for example, in the U.S. Pats. of Edwin H. Land, Nos. 3,053,659, dated Sept. 11, 1962, and 3,415,644, 3,415,645, and 3,415,646, dated Dec. 10, 1968.

Cameras of this general type comprise an exposure system adapted to form a geometrically correct (rather than mirror) image of the subject at a photosensitive element positioned for exposure within the camera. Such an exposure system includes an objective lens for forming an image, a reflector for reversing the image, and a shutter mechanism for producing exposures of a timed duration. The camera also comprises means for viewing and/or rangefinding, the latter means preferably being coupled with the lens for altering the focus of the lens; a processing system including a pair of pressure-applying rolls for distributing processing liquid between the photosensitive and image-receiving elements of a film unit during movement of the film unit between the rolls; a source of driving power such as a motor, preferably electric, for rotating the pressure-applying rolls and driving the shutter; and a mechanism also driven by the motor, for advancing a film unit from exposure position into engagement with the rolls. The camera is preferably designed to hold a plurality of film units included as part of a film pack and to successively position the film units for exposure, expose, and process the succession of film units.

An object of the invention is to provide a novel and improved self-developing camera of the type described, adapted to be folded from an operative or extended position to provide an extremely small and compact structure relative to image size and the volume of the required light path between the lens and the photosensitive element.

As noted, the camera includes a number of different operating components or mechanisms including a motor, film advance and processing systems, adjustable focus lens, a view and rangefinder system, and a reflector, all of which cooperate with one another and the functions and operations of which must be mutually controlled and coordinated. Driving, control and coordination of these multiple components is further complicated by the necessity for locating them apart from one another in different, relatively movable sections of the camera housing, accurately locating the components and coupling them to one another in the extended position of the camera, and moving the components from the extended to the folded position to provide a compact structure in which there is a minimum of unoccupied space. The achievement of a structure solving these problems in an improved, unique, and simple way constitutes another object of the invention.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Reference is now made to FIGS. 1 through 4 and 8 of the drawings wherein there is shown a folding, self-developing camera embodying the present invention. The camera, generally designated 10, comprises a housing including a rear section 12 and a forward section 14 movable relative to one another between a folded or inoperative position and an extended or operative position. Rear housing section 12 is adapted to contain an assemblage of film units, i.e., a film pack, and locate the film pack with the forwardmost film unit in position for exposure; and also includes means for processing each exposed film unit and advancing the exposed film unit from the film pack into engagement with the film-processing means. The forward housing section 14 comprises an exposure system including an objective lens and shutter, and the housing sections are coupled to one another by an erecting system and a collapsible bellows providing a lighttight chamber through which light is transmitted from the lens in the forward section to a film unit positioned for exposure in the rear section.

Rear housing section 12 (see FIG. 7) comprises, as the essential elements thereof, a rear wall 16, outer side walls 18, inner side walls 19, end walls 20 and 22, and a forward wall 24 having a recessed section 26. Section 26 is provided with a rectangular exposure aperture 28 through which light is transmitted to the forwardmost film unit of the film pack positioned for exposure within a chamber in the rear housing section defined by rear wall 16, inner side walls 19 and recessed section 26 of forward wall 24. The recessed section of the forward wall also functions to support the film pack with the photosensitive element of the forwardmost film unit properly located in position for exposure. Rear wall 16 is provided with a section or door pivotable about a hinge 30 to an open position to permit loading of a film pack into the camera housing.

The camera 10 is adapted to be employed with a film assemblage or film pack 32 comprising a plurality of film units 34 of the type shown and described in greater detail in the aforementioned U.S. Pats. Nos. 3,415,644, 3,415,645, and 3,415,646. Each film unit of this type incorporates all the materials necessary to produce a positive photographic print, and includes a photosensitive element 36, a second or image-receiving element 38 which is transparent and is secured in face-to-face relation with the photosensitive element, and a rupturable container 40 of processing liquid secured to one end of the photosensitive and second elements for dispensing its liquid contents therebetween in response to the application of compressive pressure to the container. Each film unit is adapted to be processed by advancing the film unit, container foremost, between a pair of pressure-applying members which dispense the liquid contents of the container therefrom between the photosensitive and second elements and distribute the liquid between and in contact with the two elements toward the trailing ends thereof. The image-forming process is well-known in the art and involves the formation of transferable, image-forming substances in the exposed photosensitive element and diffusion of the image-forming substances to another layer within the film unit where they form a visible, positive image. In the particular example shown herein and discussed in the aforementioned Land patents, the processing liquid includes an opacifying agent which is spread in a layer between the photosensitive element, which is preferably opaque to actinic light, and an image-receiving layer on transparent second element 38 to provide a background for the positive transfer image and to serve to mask any image formed in the photosensitive element.

Relatively small camera size and a high degree of compactness with a minimum of wasted volume in the folded position of the camera, is achieved by eliminating the necessity for providing a chamber within the camera in which the film unit is retained in a light-free environment during the image-formation process. Accordingly, the film unit is designed to be advanced from the camera almost directly into the light immediately as the processing liquid is distributed within the film unit, thereby requiring that the processing liquid be effective to prevent further exposure of the photosensitive element almost immediately as it is spread within the film unit. The opacifying agent in the processing liquid contributes to the prevention of exposure of the photosensitive element to light transmitted by the transparent second sheet, and appropriate reagents, such as a desensitizing agent, may be provided in the processing liquid to further insure that the photosensitive element is not exposed to the detriment of the visible image during processing in the light outside of the camera.

Film pack 32 comprises a plurality of film units 34 arranged in stacked relation in an opaque container 42 having a forward wall 44 provided with an exposure aperture 46 substantially coextensive in size and shape with the image to be formed and an end wall 48 formed with an exit slot 50 through which film units may be moved one at a time. A conventional spring and pressure plate assembly (not shown) may be provided in the film pack or as a component of the camera located behind the stack of film units 34 for supporting the forwardmost film unit against forward wall 44 in position for exposure and in alignment with exit slot 50. In the preferred embodiment of the camera, this spring and pressure plate assembly may take the form shown in the copending U.S. Pat. application of Irving Erlichman, Ser. No. 785,089, filed Dec. 19, 1968, now U.S. Pat. No. 3,561,339, issued Feb. 9, 1971, and be adapted, not only to urge the film units into position for exposure, but to make electrical contacts with a battery in the film pack for energizing electrical components of the camera. Openings (not shown) are provided in forward wall 44 adjacent at least one side thereof in the region of containers 40 to enable a device means within the camera for advancing the leading end of the forwardmost film unit from container 42 through slot 50, to enter the pack and engage and move the exposed film unit. The film pack is initially provided with a suitable dark slide (not shown) located between forward wall 44 and the forwardmost film unit 34 for blocking the admission of light through exposure aperture 46, the dark slide being substantially the same size as a film unit and subject to withdrawal from the film pack through exit slot 50 in the same manner as a film unit.

Forward housing section 14 is adapted to enclose a lens and shutter assembly, a mirror for reflecting light from the lens to a photosensitive element positioned for exposure in the rear housing section while effecting a reversal of the image, a viewfinder and/or a rangefinder system, and a motor for driving the components of the camera including the shutter and the film-advancing and processing mechanism. Forward housing section 14 comprises two portions: a first or forward portion 54 and a second or rear portion 56, adapted to be coupled with one another to form the forward housing section in the extended position of the camera and to be separated and stored separately in the folded position of the camera to provide for a more compact structure. Rear portion 56 includes a generally flat rectangular plate 58 having lateral flanges 60 and formed with a trapezoidal-shaped aperture 62 for admitting light from the forward housing section to the rear of the camera housing. The camera includes a conventional folding bellows 64 coupled at one end to plate 58 and at its other end to recessed section 26 of forward wall 24 around exposure aperture 28 in the recessed section to provide a lighttight chamber between plate 58 and forward wall 24 through which light is transmitted to a photosensitive element positioned for exposure behind recessed section 26.

The camera includes a conventional objective lens, designated 66, having at least one element, designated 68, movable along the optic axis of the lens for focusing. Lens 66 is mounted in forward portion 54 of the forward housing section with the optic axis of the lens arranged in a plane parallel with the plane of the photosensitive element positioned for exposure. A trapezoidal-shaped mirror 70 is mounted on plate 58 adjacent the edge of the mirror and opening 62 furtherest from the lens for movement between an operative position (see FIG. 4), in which the mirror is disposed at 45° with respect to the lens axis and the plant of the photosensitive element, and a closed position, shown in FIG. 7, in which the mirror is seated in a recess in plate 58 in closing relation to opening 62. Means, such as spring 72, are provided for biasing mirror 70 into the closed position, and means to be described hereinafter are provided for pivoting the mirror against the bias of spring 72 into the operative position thereof.

Forward portion 54 of the forward housing section is in the form of a parallelepipedon having a thickness slightly less than the thickness of rear housing section 12, and including a housing comprising a forward wall 74, rear wall 76, side walls 78, and end walls 80 and 82. Forward portion 54 is movable along a generally arcuate path from the extended position shown in FIGS. 2, 4 and 8 to the folded or storage position shown in FIGS. 1 and 7, in which portion 54 is disposed adjacent end wall 20 of the rear housing section as an extension thereof. Rear wall 12 and side walls 19 of the rear housing section are extended to provide a recess for receiving forward portion 54 in the folded position of the camera, and outer side walls 18 are also extended and cooperate with the inner side walls to provide a space for containing components of the camera mechanism including an erecting system and a transmission for driving the film feeding and processing mechanism. Lateral flanges 84 are provided on forward portion 54 as a cover for the recesses between the extensions of side walls 18 and 20 in which the erecting system and transmission are contained in the folded position of the camera.

Rear portion 56 of the forward housing section is movable generally linearly from an extended position to a folded position in which the rear portion is stored within the recess provided by recessed section 26 of forward wall 24 together with bellows 64. Forward door 88 is pivotally mounted on the rear housing section adjacent end wall 22 and is pivotable between the open position shown in FIGS. 2, 3 and 4 when the housing sections are in an extended position to a closed position shown in FIG. 1, in which door 88 covers the recess containing rear portion 60 and the folded bellows and the recesses between side walls 18 and 19 containing the erecting system and the transmission.

The camera includes two erecting systems comprising linkages for moving the two portions of the forward housing section along separate paths between their respective folded and extended positions. The first erecting system for moving forward portion 54 comprises two pairs of parallel linkages, each pair including a first link 90 and a second link 92. Links 90 and 92 are mounted for pivotal movement adjacent one end on side walls 78 of portion 54 and at their other ends on the rear housing section, for example, on side walls 18 thereof, and function to locate the forward portion 54 in generally parallel positions in the folded and extended positions of the camera housing.

A second erecting system is provided for moving rear portion 60 between the folded and extended positions thereof and comprise two linkages, each including a support link adapted, in the extended position of the camera, to provide a rigid support between the forward housing section and the rear housing section and cooperate with the rear housing section and door 88 to provide a rigid triangular structure for accurately locating the forward housing section and rigidly supporting it in the operative position. The aforementioned support link comprises first link 94, pivotally mounted at one end on the rear housing section and pivotally connects at its midportion to a second link 96, pivotally connected at its other end to a flange 98 on door 88. The other components of the second erecting system include a short link 100, pivotally connected at one end to door 88 and at its other end to flange 60 of rear portion 56; and a pin or stud 102 mounted on link 96 and engaged in a generally S-shaped slot 104 in link 100. During movement of rear portion 60 between the folded and extended positions thereof, pin 102 slides from one end of slot 104 to the other end thereof and, in so doing, functions to maintain a generally parallel relationship between plate 58 and recessed section 26 of forward wall 24, thereby providing for a simple collapsible bellows structure and a minimum of distortion of the bellows. The erecting system for rear portion 60 is itself a conventional, well-known type employed, for example, in a camera sold by Polaroid Corporation under the designation Model 80B, and may include spring detents (not shown) engaged with either or both links 94 and 96 for retaining the erecting system in the extended position in which links 94 and 96 are pivoted past the center such that the pivotal axis at which the links are joined is off a line between the centers at which links 94 and 96 are pivotally connected to the rear housing section and door 88 respectively.

Figures 1, 2, 3:
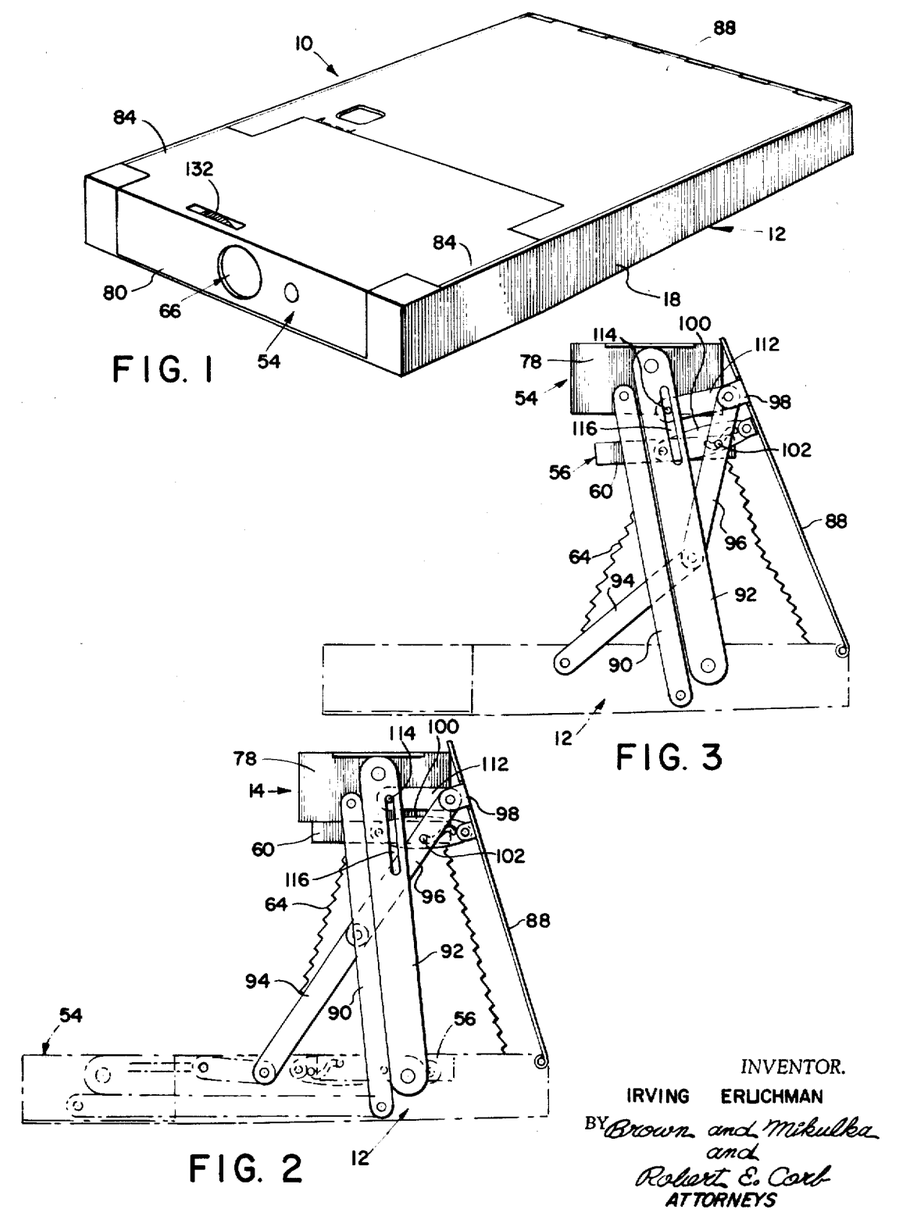
FIG. 1 is a perspective view of a camera embodying the invention shown in the folded position.
FIG. 2 is an elevational view of the camera of FIG. 1 shown in an erect position.
FIG. 3 is a view similar to FIG. 2, showing the camera in an intermediate position.

The two erecting systems are coupled to one another so as to coordinate the movement of portions 54 and 56 such that during movement of the portions from the folded position into the extended position, portion 54 arrives at the extended position prior to portion 56, which then moves linearly into engagement with portion 54. Movement of the two portions is coordinated in this manner in order to provide for interlocking and accurate positioning of the two portions relative to one another. The means for positioning the two portions including locating pins 106 mounted on springs 108 on the rear side of plate 58 outside of bellows 64 and biased by springs 108 forwardly through openings in the plate. Rear wall 76 of forward portion 54 is provided with openings 110 adapted to receive pins 106 and locate the two portions relative to one another in the extended position thereof. Pins 106 are mounted on springs 108 to permit the pins to be depressed rearwardly when the camera is folded in response to engagement of the pins by forward door 88. The two erecting systems are coupled so that movement of portions 54 and 56 into the folded position is essentially the reverse of the erecting movement, that is, portion 56 moves rearwardly, disengaging pins 106 from openings 110 prior to any substantial movement of forward portion 54 laterally with respect to portion 56. This terminal and initial movement of portion 56 relative to portion 54 is illustrated in FIG. 3 of the drawings in which portion 54 is shown as being in substantially its fully extended position while portion 56 is displaced substantially from its fully extended position.

The means for coordinating the function of the two erecting systems comprises a pair of relatively short links 112, each pivotally connecting the door 88 at the same location as link 96 and including a pin or stud 114 at its other end engaged for sliding movement in a slot 116 in link 92. The function of this interlocking system is illustrated in FIGS. 2 and 3, in which the camera is shown in the fully erected and partially folded positions. To fold the camera, the operator engages and depresses links 94, pivoting them in a clockwise direction, thereby causing pin 102, engaged in slot 104, to move link 100 rearwardly, in turn moving portion 56 rearwardly and disengaging it from portion 54. Motion of links 94 and 96 is transmitted through pin 102 and link 100 to door 88, which is pivoted only slightly, effecting substantially no movement of portion 54 during the initial movement of portion 56 from the fully extended to the partially extended position shown in FIG. 3. However, further pivotal movement of door 88 is effective as a result of engagement of pin 114 in slot 116 in link 92 to pivot link 92 in a counterclockwise direction thereby effecting the arcuate movement of forward portion 54 into the folded position thereof. Once movement of the sections toward the folded position has been initiated by pivoting link 94, movement of the portions into the fully folded position can be accomplished in a number of ways, including engaging forward portion 54 and/or door 88 by pivoting the portion or the door in a counterclockwise direction about its respective axis. Extension of the camera from the folded position is effected in substantially the reverse manner, for example, by grasping forward portion 54 and pivoting the latter toward its erect position.

Figures 4, 5, 6:
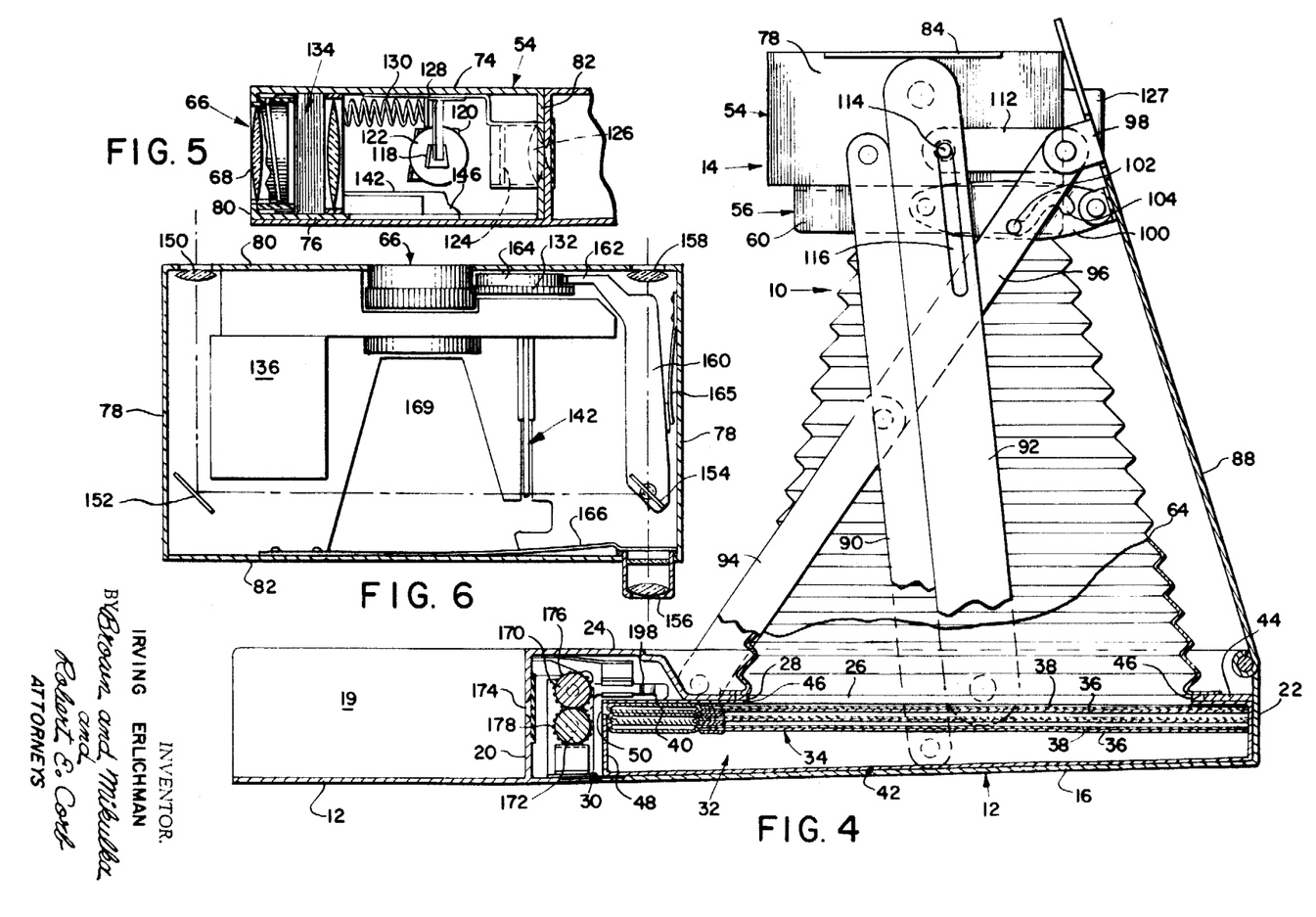
FIG. 4 is an enlarged sectional view similar to FIG. 2, illustrating the components of the camera and an assemblage of film units located within the camera.
FIG. 5 is a sectional view taken through the forward housing section of the camera substantially along the axis of the lens.
FIG. 6 is a somewhat schematic, plan view of the forward housing section, illustrating another embodiment thereof.
Figure 7:
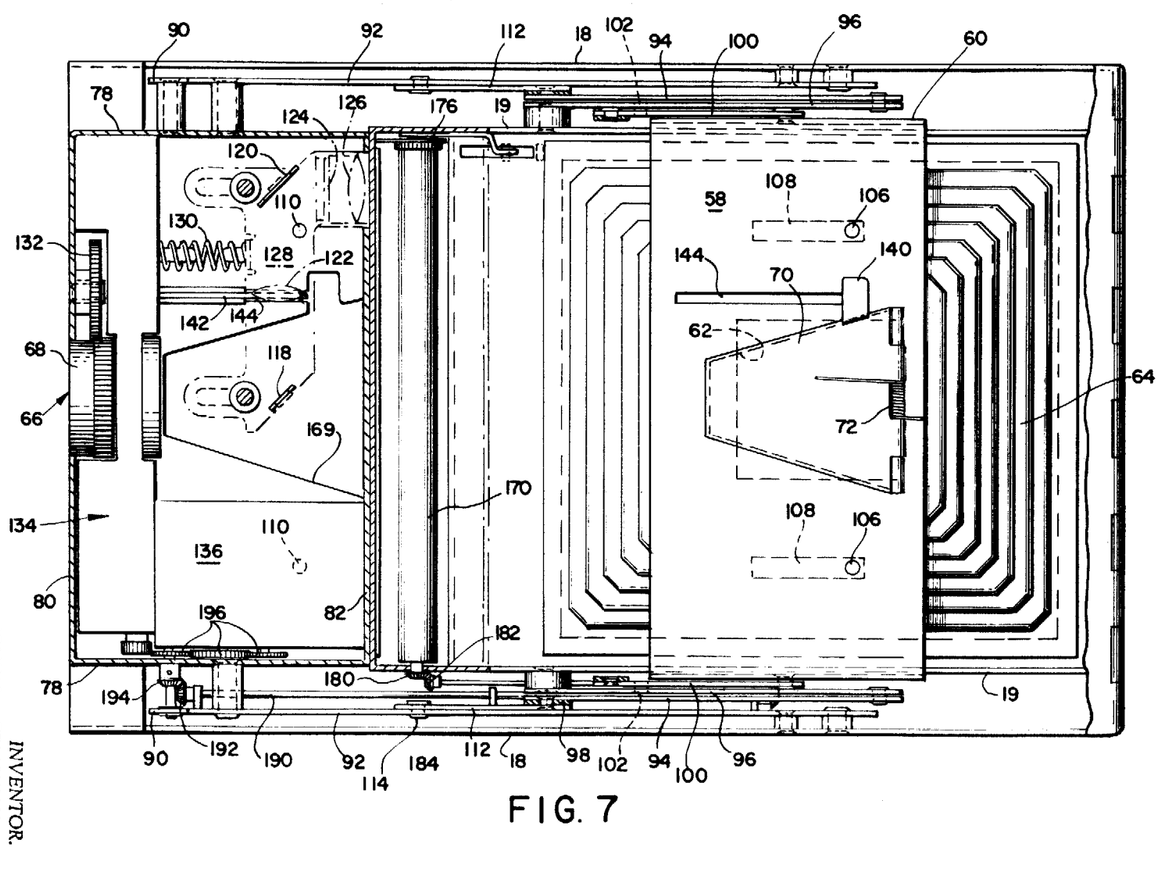
FIG. 7 is a plan view, with parts removed, of the camera shown in a folded position.
Figures 8, 9:
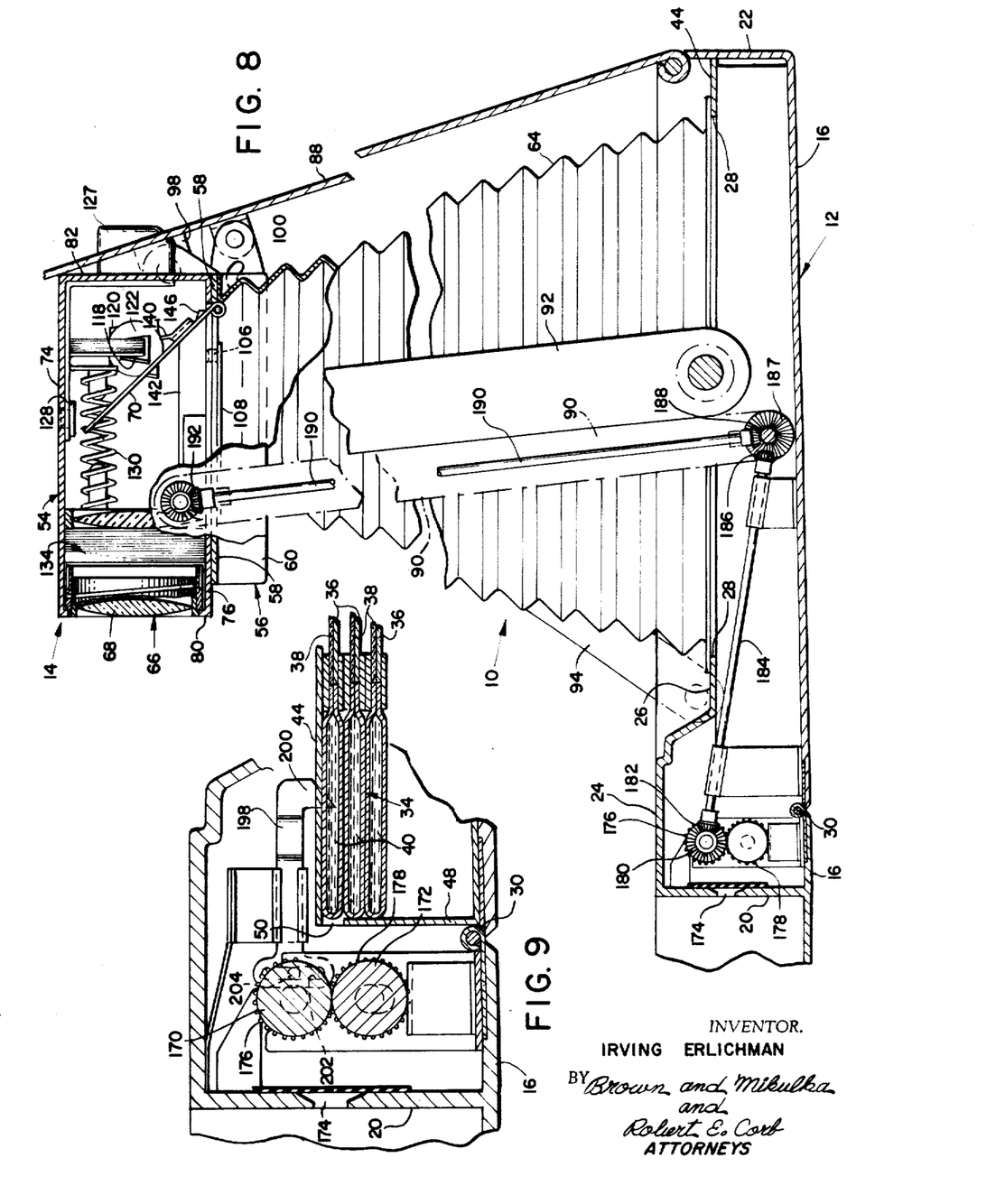
FIG. 8 is an elevational view similar to FIG. 4 and partially in section illustrating components of the camera mechanism.
FIG. 9 is an enlarged sectional view of a portion of the camera and the film assemblages employed therein.

As previously noted, the exposure and viewfinding systems are in the same housing section and the construction and operation thereof can be simplified if lens 66 is employed in the nature of a single lens reflex camera for both viewing, ranging, and exposing. Such a system is illustrated in FIGS. 5, 7 and 8, in which a mirror 118 disposed at a 45° angle with respect to the lens axis is located behind the lens in the path of light therefrom for directing light along a path perpendicular to the lens axis and substantially parallel with the plane of the photosensitive material toward a second mirror 120 for redirecting the light along a path parallel to the lens axis. The ranging and viewing system may be substantially the same as that of conventional single lens reflex cameras and including intermediate lens 122 for forming an image at a screen 124 which may include means such as wedges or the like for producing two images of the same subject which are aligned or in coincidence when lens 66 is in focus. An eye lens 126 is provided to enable the operator to view the image formed at screen 124. Mirror 118 is located behind mirror 70, and the other components of the viewing and ranging system are shown in FIGS. 5 and 7 in the folded position, the components of the viewing and ranging system being mounted on a plate 128, in turn mounted for reciprocating movement parallel with the lens axis from the folded position shown rearwardly with respect to the lens to an extended position such that mirror 118 will not interfere with mirror 70 when the latter is in its operative position. A spring 130 is provided for biasing the lens and mirrors comprising the viewing and ranging system rearwardly with respect to lens 66 into the extended position, while the housing 127 for eye lens 126 and the corner of rear housing section 12 at the juncture of walls 20 and 24 are formed with mutually cooperative cam surfaces effective to displace the viewing and ranging system forwardly with respect to lens 66 when portion 54 is moved into the folded position thereof.

Focusing of lens 66 may be achieved in a conventional manner, for example, by mounting front lens element 68 in a threaded barrel which may be rotated manually through manually engageable gear 132.

The camera includes a shutter assembly, generally designated 134, which may be of a conventional type, and the details of which are not shown. The shutter, as well as the film-advancing and processing mechanisms, are preferably operative automatically by motor means such as an electric motor, designated 136, located within portion 54 and powered by a source of current such as a battery located within the film pack with which the camera is loaded. The drive mechanism coupled with the motor includes means for coordinating the operation of the shutter and the movement of mirror 70 in order to permit viewing and taking through lens 66. The operating cycle of the camera commences with mirror 70 in the folded position blocking the passage of light through aperture 62, thereby permitting extension and folding of the camera while preventing the admission of light into the camera. The lens and shutter assembly may also include a diaphragm and a shutter blade or blades which function to prevent admission of light during movement of mirror 70 between its operative and inoperative positions and may or may not also function to make exposures of a timed duration. Thus, in the operation of the camera, actuation of the shutter to make an exposure is effective first to close a shutter, pivot mirror 70 into the operative position, close the diaphragm to a preselected setting, open and close a shutter to make an exposure of timed duration, pivot mirror 70 to its inoperative position while opening the diaphragm fully, and then opening the shutter to permit viewing and ranging through the objective lens.

Systems of this type, for coordinating the operation of a shutter, diaphragm, and mirror, are well-known in the art and are not considered to require illustration or further explanation herein. However, in the camera of the invention, mirror 70 and the shutter-driving mechanism therefor are mounted in separate, relatively movable portions of the camera housing, and one of these portions (56) is essentially a relatively thin wall so that provision must be made for coupling the shutter-driving mechanism with mirror 70. In the form shown, these coupling means include a tab 140 extending from mirror 70 in the direction parallel with the pivotal axis of the mirror and being close to that axis. The shutter-driving mechanism includes a member 142 mounted for lengthwise reciprocating motion in a channel 144 in the forward surface of plate 58. Channel 144 extends behind tab 140, and member 142 includes a wedge-shaped end section 146 adapted to function as a cam in engagement with tab 140 for pivoting mirror 70 against the bias of spring 72 into an operative position when member 142 is moved lengthwise toward the pivotal axis of the mirror.

An alternative viewing and rangefinding system is illustrated in FIG. 6 of the drawings and comprises a conventional binocular, split field rangefinder providing two light paths. One light path is defined by a lens 150 located adjacent one side of portion 54, a 45° mirror 152 for altering the direction of light from lens 150 transversely of the lens axis toward the opposite side of portion 54, and a half mirror 154 for directing light from lens 150 rearwardly through an eye lens 156. The second light path includes a lens 158 located at the opposite side of portion 54 from lens 150 for directing light past half mirror 154 through eye lens 156 so that the operator views one half of the scene through lens 150 and the other half through lens 158. Mirror 154 is mounted for pivotal movement about an axis perpendicular to the lens axis and located in the plane of the reflecting surface of the mirror on an arm 160 including a cam follower 162 engaged with a cam 164 on manually engageable gear 132. A spring 165 is provided for biasing cam follower 162 into engagement with cam 164. By virtue of this construction, there is a direct coupling between the movable component 68 of lens 66 and mirror 154, and focusing of the lens and rangefinder are accomplished by manually engaging and rotating gear 132. Eye piece 156 may be mounted for reciprocating movement into and out of the housing of portion 54 in substantially the same manner as the viewing and rangefinding system illustrated in FIG. 7, and for this purpose, may be mounted on a spring 166, in turn mounted on rear wall 82 of portion 54 and is provided with a suitable cam surface engageable with the rear housing section.

The processing system of the camera comprises a pair of juxtaposed, pressure-applying rollers 170 and 172 mounted in juxtaposition within the rear housing section between end wall 20 and the end of the film pack and biased toward one another so as to apply compressive pressure to a film unit during movement of the film unit between the rollers. Rollers 170 and 172 are adapted to be driven in, respectively, clockwise and counterclockwise directions for advancing a film unit therebetween and from the camera through a slot 174 in end wall 20. The means for driving the rollers include spur gears 176 and 178 on the ends of the rollers meshed with one another and driven through a transmission including a bevel gear 180 coupled to roller 170 and meshed with a bevel gear 182 on an elongated shaft 184 extending between inner and outer side walls 18 and 19. Shaft 184 is mounted for rotation about an axis through the axis of rotation of roll 170 and the pivotal axis of link 90 and is coupled through bevel gears 186, 187, and 188 to a second shaft 190 mounted for rotation on link 90 about an axis through the centers of pivotal movement of link 90 relative to the rear housing section and portion 54. Shaft 190 is in turn coupled through motor 136 through a bevel gear 192 on the forward end of shaft 190 meshed with a bevel gear 194 driven by a gear train 196, in turn driven by motor 136. The transmission, including shafts 184 and 190, and the various bevel gears on the ends of the shafts and at the pivotal axes of link 90 maintain the drive coupling between motor 136 and the spread rolls in both the folded and extended positions of the camera housing.

The camera also includes a system for feeding each exposed film unit from container 42 through slot 50 into the bite of rollers 170 and 172, and in the form shown, these means include reciprocating lever 198 including a hook-shaped end section 200 adapted to extend through an opening in forward wall 44 of container 42 into engagement with the forwardmost film unit and an enlarged end section provided with slot 202 for receiving a pin 204 mounted on one end of roller 170 for reciporcating lever 198 during rotation of the pressure-applying rollers.

It will be seen from the foregoing description that the stated objects of a compact, automatic, self-developing camera are achieved in a novel and unobvious folding camera structure including relatively movable forward and rear housing sections connected by a collapsible bellows in which the forward section includes two relatively movable portions and a mirror and the portions are moved between folded and extended portions by two interconnected erecting systems. This structure solves in a novel manner, the complex problems of coupling and coordinating the operation of the many components of the mechanism of a folding camera designed to automatically expose and produce photographic prints having a relatively large format in a camera which, when folded, is relatively small and compact.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A folding camera comprising in combination:
   a housing including first and second sections movable relative to one another between a compact, folded position and an extended, operative position;
   support means within said first section for locating a photosensitive element in position for exposure;
   optical means in said second section for forming an image of a subject at a photosensitive element positioned for exposure in said first section;
   reflecting means located in said second section in the path of light transmitted by said optical means between the latter and said support means when said sections are in said operative position, for reflecting light from said optical means toward a photosensitive element positioned for exposure in said first section;
   said second section including two portions joined in said extended position and separated in said folded position, said optical means being mounted on said first portion and said reflecting means being mounted on said second portion; and
   erecting means for moving said first and second portions relative to one another and said first section between said folded and extended positions and supporting said sections in said extended position with said portions joined to one another.

2. A folding camera comprising in combination:
   a housing including first and second sections movable relative to one another between a compact, folded position and an extended, operative position;
   support means within said first section for locating a photosensitive element in position for exposure;
   optical means in said second section including an objective lens for forming an image of a subject at a photosensitive element positioned for exposure in said first section;
   said support means including means for locating a photosensitive element in position for exposure substantially in a plane arranged at an angle other than perpendicular to the axis of said lens when said housing sections are in said extended position; and reflecting means including a mirror mounted in said second section behind said lens in the path of light transmitted by said lens for reflecting light from said lens toward a photosensitive element positioned for exposure in said first section, said mirror being mounted for movement between a first position in the path of light transmitted by said lens along the axis thereof and a second position out of said path of light.

3. A folding camera comprising in combination:

a housing including first and second sections movable relative to one another between a compact, folded position and an extended, operative position;

support means within said first section for locating a photosensitive element in position for exposure;

optical means in said second section for forming an image of a subject at a photosensitive element positioned for exposure in said first section; and reflecting means located in said second section in the path of light transmitted by said optical means when said sections are in said operative position, for reflecting light from said optical means toward a photosensitive element positioned for exposure in said first section;

said reflecting means being movable between a first position in said path of light transmitted by said optical means, for reflecting light from said optical means toward a photosensitive element supported in position for exposure, and a second position out of said path.

4. A folding camera as defined in claim 3 further including second optical means within said second section for enabling an operator to view through said first optical means when said reflecting means are in said second position.

5. A folding camera as defined in claim 4 wherein said optical means include an objective lens and said support means locate said photosensitive element in position for exposure in a plane substantially parallel with the optic axis of said lens.

6. A folding camera as defined in claim 4 wherein said reflecting means include a mirror for preventing light admitted into said housing through said second optical means from exposing a photosensitive element positioned for exposure in said first section.

7. A folding camera as defined in claim 6 further including a shutter in said second section associated with said optical means for making exposures of a timed duration and means for coordinating the operation of said shutter with the movement of said mirror.

8. A folding camera as defined in claim 7 wherein the last-mentioned means include means for moving said mirror between said first and second positions during periods when said shutter is closed, when said mirror is in said first position, opening and closing said shutter to make exposures and, when said mirror is in said second position, opening said shutter to permit viewing through said first optical means.

9. A folding camera as defined in claim 4 wherein said optical means include an objective lens including at least an element movable axially to adjust the focus of said lens.

10. A folding camera comprising in combination:

a housing including first and second sections movable relative to one another between a compact, folded position and an extended, operative position;

support means within said first section for locating a photosensitive element in position for exposure;

optical means in said second section including an objective lens for forming an image of a subject at a photosensitive element positioned for exposure in said first section, said lens including at least an element movable axially to adjust the focus of said lens;

said support means including means for locating a photosensitive element in position for exposure substantially in a plane arranged at an angle other than perpendicular to the axis of said lens when said housing sections are in said extended position;

reflecting means located in said second section in the path of light transmitted by said optical means when said sections are in said operative position, for reflecting light from said optical means toward a photosensitive element positioned for exposure in said first section; and ranging means in said second section coupled with said element of said lens.

11. A folding camera comprising in combination:

a housing including first and second sections movable relative to one another between a compact, folded position and an extended, operative position;

said second section including first and second portions movable relative to one another between conjoined and separated positions during movement of said first and second sections between, respectively, said extended and folded positions;

support means within said first section for locating a photosensitive element in position for exposure;

optical means mounted in said first portion of said second section for forming an image of a subject at a photosensitive element positioned for exposure in said first section; and reflecting means located in said second portion of said second section in the path of light transmitted by said optical means when said sections are in said operative position, for reflecting light from said optical means toward said photosensitive element positioned for exposure in said first section.

12. A folding camera as defined in claim 11 further including means for connecting said portions and forming a lighttight seal between said portions in said extended position of said section.

13. A folding camera comprising in combination:

a housing including first and second sections movable relative to one another between a compact, folded position and an extended, operative position;

said second section including first and second portions movable relative to one another between conjoined and separated positions during movement of said first and second sections between, respectively, said extended and folded positions;

support means within said first section for locating a photosensitive element in position for exposure;

optical means mounted in said first portion of said second section for forming an image of a subject at a photosensitive element positioned for exposure in said first section; and reflecting means mounted on said second portion of said second section for movement from a first position in said path of light transmitted by said optical means, for reflecting light from said optical means toward a photosensitive element positioned for exposure in said first section, to a second position out of said path.

14. A folding camera as defined in claim 13 further including collapsible enclosure means coupled between said second portion and said first section and providing a lighttight chamber through which light is transmitted from said second section to a photosensitive element positioned for exposure within said first section.

15. A folding camera as defined in claim 14 wherein said reflecting means include a mirror adapted, in said second position, to prevent the admission of light into said chamber provided by said enclosure means.

16. A folding camera as defined in claim 14 wherein said enclosure means include a folding bellows.

17. A folding camera as defined in claim 14 further including first erecting means for moving said first portion between said folded and extended positions and second erecting means for moving said second portion between said folded and extended positions.

18. A folding camera as defined in claim 17 wherein said first erecting means are adapted to move said first portion along an arcuate path between said folded position in which said second section is arranged in side-by-side relation with said first section and defines a lateral extension thereof and said extended position in which said sections are in spaced relation.

19. A folding camera as defined in claim 17 wherein said second erecting means are adapted to move said second portion generally linearly between said folded and extended positions.

20. A folding camera as defined in claim 17 wherein said second erecting means include a cover member movably, coupled to said first section and, in said folded position, cooperating with said first section to enclose said second portion and said enclosure means.

21. A folding camera comprising in combination:
- a housing including first and second sections movable relative to one another between a compact, folded position and an extended, operative position;
- said second section including first and second portions movable relative to one another between conjoined and separated positions during movement of said first and second sections between, respectively, said extended and folded positions;
- support means within said first section for locating a photosensitive element in position for exposure;
- optical means in said second section for forming an image of a subject at a photosensitive element positioned for exposure in said first section;
- reflecting means located in said second section in the path of light transmitted by said optical means when said sections are in said operative position, for reflecting light from said optical means toward said photosensitive element positioned for exposure in said first section;
- first erecting means for moving said first portion along a first path between said folded and extended positions; and
- second erecting means for moving said second portion along another path between said folded and extended positions.

22. A folding camera as defined in claim 21 wherein said first path is curved and said other path is generally linear.

23. A folding camera comprising in combination:
- a housing including first and second sections movable relative to one another between a compact, folded position and an extended, operative position;
- support means within said first section for locating a photosensitive element in position for exposure;
- optical means in said second section for forming an image of a subject at a photosensitive element positioned for exposure in said first section;
- reflecting means located in said second section in the path of light transmitted by said optical means when said sections are in said operative position, for reflecting light from said optical means toward a photosensitive element positioned for exposure in said first section;
- advancing means located with said first section for moving a photosensitive element from exposure position;
- a shutter located in said second section in association with said optical means for making exposures of a timed duration;
- drive means within said section; and
- power transmission means coupled between said drive means and said advancing means and said shutter means for operating said advancing means and said shutter means.

24. A folding camera as defined in claim 23 wherein said reflecting means are movable between a first position in said path of light transmitted by said optical means for reflecting said light toward a photosensitive element positioned for exposure and a second position out of said path, and said drive means are coupled with said reflecting means for moving the latter between said first and second positions.

25. A folding camera comprising, in combination:
- a housing including first and second sections movable relative to one another between folded and extended positions;
- support means within said first section for locating a photosensitive element in position for exposure;
- image-forming optical means within said second section;
- said second section comprising first and second portions coupled with one another in said extended position of said camera housing and located apart from one another in said folded position of said camera housing;
- said optical means being mounted on said first portion of said second section;
- collapsible enclosure means coupled between said first section and said second portion of said second section and cooperating therewith to provide a lighttight chamber between said first and second sections;
- first linkage means connected between said first housing section and said first portion of said second housing section for moving the latter between said folded and extended positions thereof and supporting said first portion in said extended position;
- second linkage means connected between said first section and said second portion of said second section for moving the latter between said folded and extended positions thereof; and
- means coupling said first and second linkage means for coordinating the motion of said first and second portions of said second section relative to one another and said first section between said folded and extended positions.

26. A folding camera as defined in claim 25 wherein said second portion includes an aperture for transmitting light from said optical means through said chamber to a photosensitive element positioned for exposure in said first section, said camera further including reflecting means mounted on said second portion for directing light from said optical means through said aperture toward a photosensitive element positioned for exposure.

27. A folding camera comprising, in combination:
- a housing including first and second sections movable relative to one another between folded and extended positions;
- said second section comprising first and second portions coupled with one another in said extended position of said camera housing and located apart from one another in said folded position of said camera housing;
- support means within said first section for locating a photosensitive element in position for exposure;
- image-forming optical means mounted within said second section on said first portion thereof;
- collapsible enclosure means coupled between said first section and said second portion of said second section and cooperating therewith to provide a lighttight chamber between said first and second sections;
- said second section of said second portion including an aperture for transmitting light from said optical means through said chamber to a photosensitive element positioned for exposure in said first section;
- reflecting means including a mirror mounted on said second portion for movement between an operative position in which said mirror reflects light from said optical means through said aperture toward a photosensitive element positioned for exposure, and an inoperative position in which said mirror closes said aperture against the passage of light therethrough; and
- first and second erecting means for moving, respectively, said first and second portions of said second section relative to one another and said first section between said folded and extended positions.

28. A folding camera as defined in claim 25 wherein said first linkage means move said first portion along an arcuate path between said folded position adjacent one side of said first section to an extended position spaced from said first section and located in front of said second portion, and second linkage means move said second portion along the generally linear path between a folded position and an extended position in engagement with said first portion between the latter and said first section.

29. A folding camera as defined in claim 28 wherein said first linkage means move said first portion substantially into said extended position prior to completion of movement of said second portion along an intersecting path into said extended position and move said second portion into operative engagement with said first portion during the terminal portion of movement of said second portion into said extended position; and said second linkage means move said second portion from extended position and from operative engagement with said first portion prior to substantial movement of said first portion from said extended position.

30. A folding camera comprising, in combination:
a housing including first and second sections movable relative to one another between folded and extended positions;
said second section comprising first and second portions coupled with one another in said extended position of said camera housing and located apart from one another in said folded position of said camera housing;
support means within said first section for locating a photosensitive element in position for exposure;
image-forming optical means mounted within said second section on said first portion thereof;
collapsible enclosure means coupled between said first section and said second portion of said second section and cooperating therewith to provide a lighttight chamber between said first and second sections;
said second section of said second portion including an aperture for transmitting light from said optical means through said chamber to a photosensitive element positioned for exposure in said first section;
reflecting means including a mirror mounted on said second portion for movement between an operative position in which said mirror reflects light from said optical means through said aperture toward a photosensitive element positioned for exposure, and an inoperative position in which said mirror closes said aperture against the passage of light therethrough.

31. A folding camera as defined in claim 29 wherein said means coupling said first and second linkage means coordinate movement of said first portion along a linear path with movement of said second portion along an arcuate path to bring said first and second portions into operative engagement in said extended position of said housing sections.

* * * * *